United States Patent Office 3,325,550
Patented June 13, 1967

3,325,550
SUBSTITUTED POLYCHLOROTRINDENE DERIVATIVES
Victor Mark, Ransomville, N.Y., assignor to Monsanto Company, St. Louis, Mo., a corporation of Delaware
No Drawing. Filed May 25, 1965, Ser. No. 458,738
8 Claims. (Cl. 260—648)

This application is a continuation-in-part of application Ser. No. 146,321, filed Oct. 19, 1961, by Victor Mark, and now abandoned.

This invention relates to new chlorinated cyclic compounds having valuable properties as are hereinafter described. More specifically, the invention relates to chlorocarbons having one or more organic radicals substituted thereon. The novel reaction by which the useful products are formed is also hereinafter claimed.

The new compounds are prepared by treating a chlorocarbon $C_{15}Cl_{10}$ with an ester of an acid of trivalent phosphorus. The chlorocarbons have the structure:

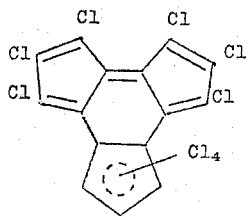

These compounds are prepared by the procedure described and claimed in application Ser. No. 146,320, filed Oct. 19, 1961, by Victor Mark, and now abandoned. In the above structure the concentric circle indicates the presence of two conjugated double bonds. Thus, there are three isomeric forms of initial compound and the resulting products. The reaction may be practiced with any of the three isomers or with mixtures of the $C_{15}Cl_{10}$ chlorocarbon isomers which will have the structures:

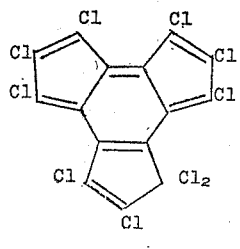

(A)

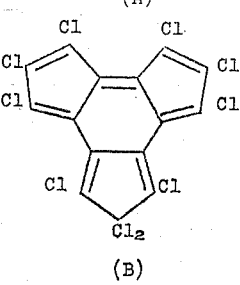

(B)

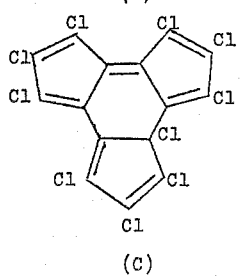

(C)

The replaceable chlorine atoms are those which are on the allylic carbon atoms (a carbon atom that is not involved in an unsaturated bond). In the isomeric structures (A) and (B) there are two allylic chlorine atoms, thus allowing the introduction of two substituents. In the third isomeric structure (C), there is only one allylic chlorine atom, thus allowing the introducion of one substituent. In the substitution step, however, an isomerization between structures A, B and C can take place, the net result of which is the possibility of introducing two substituents into the ring irrespective of which isomer constituted the $C_{15}Cl_{10}$ chlorocarbon. These $C_{15}Cl_{10}$ chlorocarbons are hereinafter described as decachlorotrindenes.

The substituents on the ring effect considerably the physical, spectral, chemical and biological properties of the chlorocarbon, thus allowing the preparation of a wide variety of derivatives with varied and useful properties.

A wide variety of esters of the trivalent phosphorus acids are used in accordance with this invention to effect a dechlorination and the substitution of an organic radical into the $C_{15}Cl_{10}$ chlorocarbon. Suitable esters are those having the general structure:

wherein $m$ is an integer from one to three; wherein $p$ and $q$ are integers from zero to two; wherein R and R' groups are organic radicals; and wherein Z is a halogen atom; provided that $m+p+q=3$.

The phosphite reactants are of several different types. The most readily available trivalent phosphorus esters are the trisubstituted phosphites; including the trialkyl phosphites, such as trimethyl phosphite, triisopropyl phosphite, tri-n-butyl phosphite, tris(2-chloropropyl)phosphite, tris(3-nitro-n-butyl)phosphite, tris(2-ethylhexyl) phosphite, tridodecyl phosphite, trioctadecyl phosphite and trialkylphosphites having up to 20 carbon atoms in the alkyl group; the trialkenyl phosphites, such as the triallyl phosphite, tris(2-chloroallyl)phosphite, tris(bromocrotyl)phosphite, tris(3 - nitrobutenyl)phosphite, tris (undecyl-10-en-1-yl)phosphite and the trialkenyl phosphites having up to 20 carbon atoms in the alkenyl groups; the trialkynyl phosphites, such as the tripropargyl phosphite, tritetrolyl phosphite and tris(undecyl-10-yn-1-yl) phosphite; the triaryl phosphites, such as triphenyl phosphite, trinaphthyl phosphite and tris(biphenylyl)phosphite; the tris(araliphatic)phosphites, such as tribenzyl phosphite, triphenethyl phosphite and tricinnamyl phosphite; the tris(alkaryl)phosphites, such as tritolyl phosphite, trixylyl phosphite, tris(dodecylphenyl)phosphite and the tris(methylnaphthyl)phosphite; the tricycloalkyl phosphites, such as tricyclohexyl phosphite, tricyclopentyl phosphite, tris(cyclohex-2-enyl)phosphite and tris(cyclopent-2-enyl)phosphite; the heterocyclic phosphites, such as tris(tetrahydrofurfuryl)phosphites; and the substituted derivatives of the above groups. These include all kinds of substituents which do not, under the conditions of the alkylation reaction, react with the trivalent phosphorus ester. Such substituents include the halo, alkoxy, alkylthioxy, alkylamino, sulfinyl, acyloxy, hydroxyl, sulfonyl, amino, cyano, alkoxycarbonyl, acyl, carbonyl, thiocarbonyl, nitro, thiocyano, alkenoxy, alkynoxy and mercapto.

Mixed phosphites containing a plurality of esterifying radicals (as distinguished from the symmetrical phosphites described above) are also useful, for example diethyl methyl phosphite, benzyl 2-ethoxyethyl phenyl phosphite and cyclohexyl dimethyl phosphite. The unsymmetrical phosphite may contain two or three different hydrocarbonoxy (RO)-groups in any combination of the esterifying groups described in the next preceding paragraph. The mixed types, however, are usually not preferred agents for introducing radicals on the chlorocarbon $C_{15}Cl_{10}$ because often mixtures of several substituted chlorocarbons are obtained.

Other phosphites have one or two halogen atoms bonded to the phosphorus atom and these will have one or two available organic groups. This type of compound includes the halophosphites, such as diethyl chlorophosphite, benzyl dibromophosphite, diallyl chlorophosphite, octadecyl dichlorophosphite, bis(ethoxypropyl) fluorophosphite, 3-nitrobutenyl dichlorophosphite, dimethyl iodophosphite and other phosphites containing less than two organic radicals and one or two halogen atoms.

The phosphonites containing only two esterifying groups, for example the dimethyl methylphosphonite, the diethyl phenyl-phosphonite, the dipropyl benzylphosphonite, the dimethyl vinylphosphonite, the diallyl chloroethylphosphonite, the bis(2-chloroethyl)dodecylphosphonite, the dicyclohexyl cyclohexylphosphonite and the dicinnamyl phenylphosphonite can also be used.

Although the phosphonites containing two like esterifying groups are preferred because only one product can be formed, the mixed esters, which may form a mixture of the two different chlorocarbons, may also be used. Thus, compounds such as ethyl propyl ethylphosphonite, ethyl phenylphosphonite, allyl methyl benzylphosphonite, and others containing two different radicals described above as esterifying radicals and a single organic radical substituted on the phosphorus atom can be used.

When, however, the two esterifying groups in the phosphonite ester are of markedly different reactivity, it is possible to obtain a predominantly homogeneous reaction product in which the group substituted on the $C_{15}Cl_{10}$ molecule is derived from the more reactive esterifying organic radical. Such a general case exists when alkyl and aryl groups are the esterifying radicals, such as in methyl phenyl phenylphosphonite, and in which case always the aliphatic radical is substituted on the allylic carbon of the chlorocarbon.

The chlorocarbon $C_{15}Cl_{10}$ may also be substituted by means of the phosphinite esters. These have only a single ester group and, therefore, only chlorocarbons with the same alkyl group are formed. The useful phosphinites, that is, those trivalent phosphorus esters which have two organic radicals bonded directly to the phosphorous atom and have a single organic radical as the esterifying group, include methyl dimethylphosphinite, ethyl methylisopropylphosphinite, isopropylbenzyl(2-chloroethyl)-phosphinite, 2-chloroethyl diphenylphosphinite, allyl diphenylphosphinite, and other phosphinites which contain a single group of any of the esterifying groups described above with respect to the phosphites or phosphonites and two groups, different or identical, also selected from the above-described esterifying groups substituted directly on the phosphorus atom.

The reaction between the above-described chlorocarbons and the phosphite esters (including phosphonites and phosphinites) may be conducted with or without an inert organic liquid medium. Useful media include the aromatic hydrocarbons, such as benzene, toluene and the xylenes, the cycloaliphatic hydrocarbons, such as cyclohexane and cyclopentane, and the aliphatic hydrocarbons, such as n-pentane, n-hexane, and homologues and isomers thereof. In general, any organic solvent which, under the usually mild reaction conditions does not react with the trivalent phosphorus ester reagent, can be used as the reaction medium. Ethers, esters, ketones and even alcohols and halogenated solvents, such as $CCl_4$, $CHCl_3$, $C_2HCl_3$, and $C_2Cl_4$ can be used if a very reactive substitution agent is used as the reactant. Either of the reagents is charged to the reactor or dissolved in the medium and the other added thereto at a rate which permits a continuous but not too vigorous reaction as indicated usually by the increase in temperature. The reaction of phosphite esters of high molecular weight (the esterfying group with more than 8 carbon atoms or smaller if the alkyl groups are substituted with electronegative groups, such as halogen atoms) may be conducted satisfactorily at temperatures as low as 10° C. but preferably between 15 and 125° C. The most convenient control of the reaction will involve operation at the reflux temperature of the reaction mixture with the inert solvent medium selected so as to provide a continuous controlled reaction rate.

When trivalent phosphorus esters of low reactivity are used both reactants can be charged simultaneously to the reactor at a temperature which is below that of the threshold conditions and the desired conversion can be achieved by warming up to and keeping the reactants at a temperature range where the reaction proceeds at a convenient rate.

Pressure does not appear to be a critical factor in carrying out the alkylation reaction. It is preferred that the reaction be run in ordinary apparatus at atmospheric pressure. If desired, the reaction may be run at pressures either above or below atmospheric pressure without changing the character or yield of the process.

It is preferred, however, to exclude moisture from the reactor in order to prevent the hydrolysis of the phosphorus containing reactant or products. In cases where the trivalent phosphorus compound is sensitive to air oxidation, such as triallyl phosphite, benzyl dimethyl phosphinite, it is preferred to apply a protecting neutral gas blanket such as nitrogen, $CO_2$, argon, krypton, methane or neon.

After all of the reagents have been combined and the reaction completed, the desired product may be separated from the reaction mixture. This can be done by distilling off the volatile products. If a solvent is used, the first fraction recovered will usually be this solvent. At a somewhat higher temperature any unreacted phosphite, phosphonite, phosphinite and the by-product, halophosphate, halophosphonate or halophosphinate will be obtained. A very substantial part of the product balance is the desired chlorocarbon with the organic substituent derived from the esterifying group of the phosphorus ester. The residue can often be purified by recrystallization or eventually thorough water or alcohol wash in order to eliminate any phosphorus-containing material.

The new reaction may be represented by the following equation:

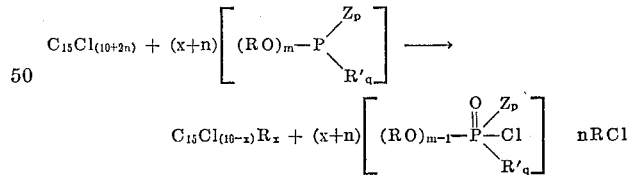

wherein R is an organic radical; wherein R' is the same or different organic radical; wherein Z is a halogen atom; wherein $n$ is an integer from zero to one; wherein $x$ is an integer from one to two; wherein $m$ is an integer from one to three; and wherein $p$ and $q$ are integers from zero to two; provided that the sum of $m+p+q$ is always three.

These substituted chlorocarbons have properties that render them especially useful for specific purposes. For example, the replacement of one or two chlorines of the $C_{15}Cl_{10}$ renders the products more soluble in hydrocarbons, such as gasoline, oils and chlorinated solvents and are therefore useful dyes for oils or for substances which are oil-soluble or permeable by hydrocarbon solvents. Other substitutents affect the color and make the products more suitable for specific purposes. The substitution of polar groups promotes the affinity of the colored compounds for wool, silk, cellulose and synthetic fibers, thereby improving the utility of the compounds as dyes and pigments. The solubility of these substituted chlorocarbons in most synthetic polymers provides a wide field of use in the preparation of transparent or translucent colored products.

Further details of the preparation of the novel products are set forth in the following specific examples:

Example I

A slurry of 30.3 g. (0.05 mole) of dodecachlorodihydrotrindene in 300 ml. of benzene was heated to reflux while 16.6 g. (0.1 mole) of triethyl phosphite was being added dropwise. An immediate reaction was noted by the formation of an intensely purple reaction mixture. After the addition which required 30 minutes, the solution was refluxed for a period of 3 hours. A gaseous product collected during this operation and was identified as ethyl chloride. The solvent was evaporated under a water-pump vacuum; the residue was heated up in a 0.5 mm. vacuum to 60° C. when a liquid identified as diethyl phosphorochloridate was collected. The dark purple solid was triturated with water, filtered, washed and identified as $C_{17}H_5Cl_9$. The reaction can thus be represented as:

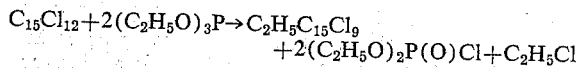

and the product by the structural formula:

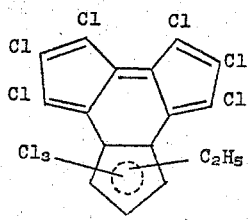

Spectral properties of the compound indicate the presence of a fulvalenoid structure responsible for its intense purple color. The presence of the ethyl group is readily identified by infrared spectrum. Its presence accounts for the solubility of the purple compound in hydrocarbons, chlorocarbons and most organic solvents.

Example II

Decachlorotrindene, prepared by the reaction of triethyl phosphite and dodecachlorodihydrotrindene, was refluxed in benzene with an additional quantity of triethyl phosphite. The reagents were combined gradually over a 30-minute period and the reaction mixture heated at reflux for three hours. The solvent was evaporated under a water-pump vacuum. The residue was heated to 60° C. under a 0.5 mm. pressure and the evolved vapors condensed and analyzed. This was identified as diethyl phosphorochloridate. The dark purple solid residue was triturated with water, filtered, washed and identified as $C_{17}H_5Cl_9$ which was found to have the structure

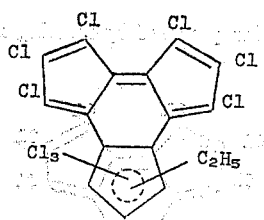

Example III

Decachlorotrindene, prepared by the action of sodium iodide on dodecachlorodihydrotrindene, was refluxed in benzene with the stoichiometric amount (one mole) of triisopropyl phosphite. Workup of the intensely colored reaction mixture yielded diisopropyl phosphorochloridate and isopropylnonachlorotrindene:

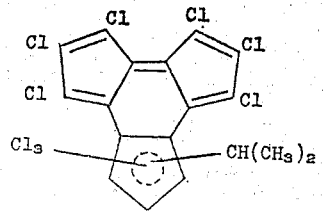

Example IV

The procedure of Example I was exactly repeated except that the equivalent amount of trimethyl phosphite was substituted for the ethyl analogue. Workup of the intensely colored reaction mixture yielded methyl chloride, methyl phosphorochloridate and methylnonachlorotrindene:

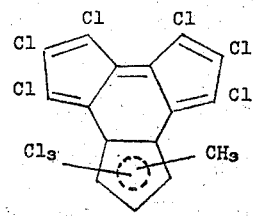

Example V

Repeating the procedure of Example III with the equivalent amount of tridodecyl phosphite being substituted for isopropyl phosphite yielded dodecylnonachlorotrindene, a highly oil-soluble colored compound:

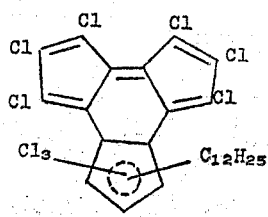

Example VI

Repeating the procedure of Example I with the equivalent amount of tris(2-chloroethyl)phosphite being substituted for ethyl phosphite yielded 2-chloroethylnonachlorotrindene, a highly soluble colored compound:

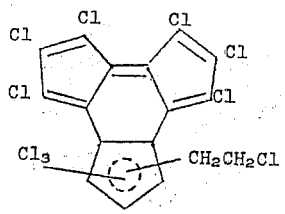

Example VII

Repeating the procedure of Example III with the equivalent amount of tris(2-acetoxyethyl)phosphite being substituted for isopropyl phoshite yielded 2-acetoxyethylnonachlorotrindene, a highly soluble colored compound with dye properties:

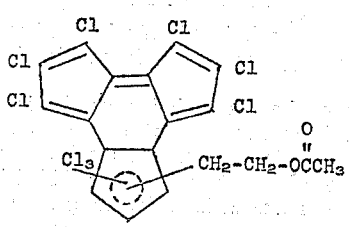

Example VIII

Repeating the procedure of Example III with the equivalent amount of tricyclohexyl phosphite being substituted for isopropyl phosphite yielded cyclohexylnonachlorotrindene, a highly soluble colored compound:

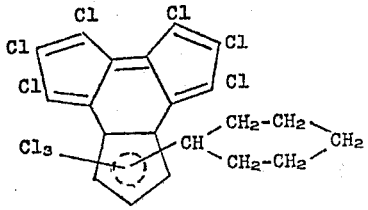

Example IX

Repeating the procedure of Example I with the equivalent amount of allyl phosphite being substituted for ethyl phosphite yielded allylnonachlorotrindene, a highly soluble colored compound:

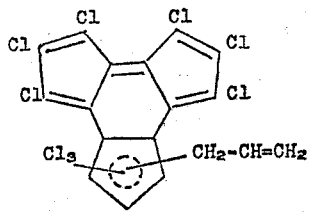

Example X

The procedure of Example II was exactly repeated except that twice the amount of ethyl phosphite was used. The intensely purple product was identified as diethyloctachlorotrindene:

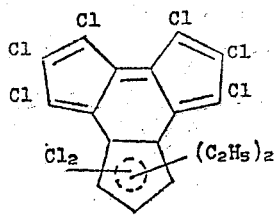

Example XI

The procedure of Example II was repeated with twice the amount of trimethyl phosphite to yield dimethyloctachlorotrindene:

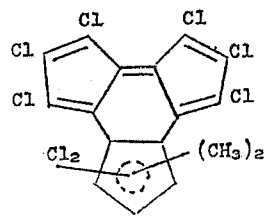

Example XII

The dying property of ethylnonachlorotrindene is illustrated by its incorporation, in high dilution, into polypropylene. Molding of the polymer yielded a translucent product with a purple color. The color is stable to heat and light.

Example XIII

A stable purple solution is obtained when a small amount of isopropylnonachlorotrindene is dissolved in gasoline.

Although the above description of the invention is written with reference to specific embodiments, these are not intended to limit the scope of the invention. Other modifications will be apparent to those skilled in the art and can well be made without departing from the spirit of concept.

What is claimed is:
1. A composition prepared by reacting a compound of the structure

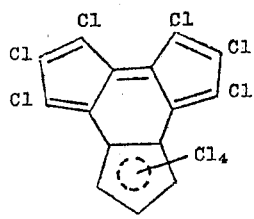

with a compound of the structure

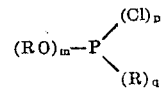

wherein R is selected from the group consisting of alkyl having up to 20 carbon atoms, alkenyl having up to 20 carbon atoms and cyclohexyl; wherein $m$ is an integer from one to three; and wherein $p$ and $q$ are integers from zero to two, provided that the sum of $m$, $p$ and $q$ is three, in an inert solvent medium at a temperature between 10° C. and the reflux temperature.

2. A composition prepared by reacting a compound of the structure

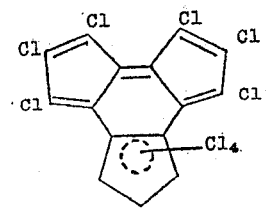

with an alkyl phosphite wherein the alkyl moiety has up to 20 carbon atoms, at a temperature between 10° C. and 125° C.

3. A composition prepared by reacting a compound of the structure

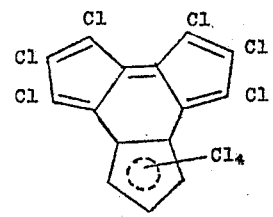

with an alkenyl phosphite wherein the alkenyl moiety has up to 20 carbon atoms, at a temperature between 10° C. and 125° C.

4. A composition prepared by reacting a compound of the structure

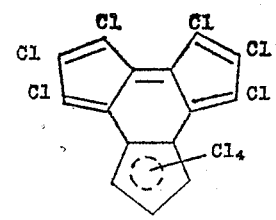

with methyl phosphite, at a temperature between 10° C. and 125° C.

5. A composition prepared by reacting a compound of the structure

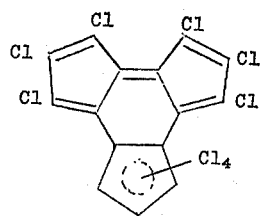

with ethyl phosphite, at a temperature between 10° C. and 125° C.

6. A composition prepared by reacting a compound of the structure

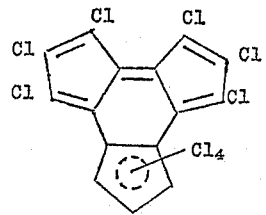

with dodecyl phosphite, at a temperature between 10° C. and 125° C.

7. A composition prepared by reacting a compound of the structure

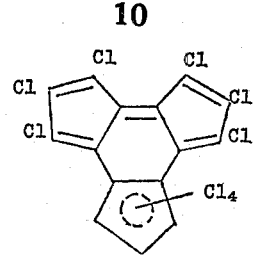

with allyl phosphite, at a temperature between 10° C. and 125° C.

8. A composition prepared by reacting a compound of the structure

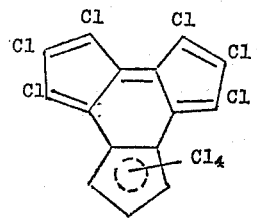

with isopropyl phosphite, at a temperature between 10° C. and 125° C.

No references cited.

LEON ZITVER, *Primary Examiner.*

M. JACOB, *Assistant Examiner.*